United States Patent [19]
Gasson et al.

[11] 3,914,278
[45] Oct. 21, 1975

[54] PROCESS FOR PREPARING ACRYLONITRILE USING AS CATALYST AN OXIDE COMPOSITION OF ANTIMONY, TIN, TITANIUM AND COPPER OR IRON

[75] Inventors: Edward James Gasson, Dollar; Stanley Frederic Marrian, Aberdour; Thomas Charles Krosnar, Polmont, all of Scotland

[73] Assignee: BP Chemicals International Limited, London, England

[22] Filed: Mar. 12, 1973

[21] Appl. No.: 339,998

[30] Foreign Application Priority Data
Mar. 17, 1972 United Kingdom............ 012607/72
Oct. 5, 1972 United Kingdom............ 045960/72

[52] U.S. Cl............................. 260/465.3; 260/465.3
[51] Int. Cl.................... C07c 121/02; C07c 121/32
[58] Field of Search................................. 260/465.3

[56] References Cited
UNITED STATES PATENTS
3,269,957  8/1966  Bethell............................ 260/465.3
3,338,952  8/1967  Callahan et al.................. 260/465.3
3,431,292  3/1969  Callahan et al.................. 260/465.3
3,625,867  12/1971  Yoshino et al.................. 260/465.3
3,636,066  1/1972  Yamada et al................... 260/465.3
3,681,421  8/1972  Barclay et al................... 260/465.3

FOREIGN PATENTS OR APPLICATIONS
931,940  7/1963  United Kingdom............. 260/465.3

*Primary Examiner*—Joseph P. Brust
*Attorney, Agent, or Firm*—Brooks Haidt Haffner & Delahunty

[57] ABSTRACT

Acrylonitrile is prepared by reacting in the vapor phase at an elevated temperature propylene, molecular oxygen, and ammonia in the presence of a catalyst which comprises a multi-metal oxide composition comprising the metal elements antimony, tin, titanium, copper and/or iron. The catalyst may also contain an additional metal such as magnesium, zinc, vanadium, uranium, chromium, manganese, molybdenum, tungsten, cobalt, nickel, indium, arsenic, bismuth or tellurium. Use of such a catalyst improves the yields of acrylonitrile.

16 Claims, No Drawings

PROCESS FOR PREPARING ACRYLONITRILE USING AS CATALYST AN OXIDE COMPOSITION OF ANTIMONY, TIN, TITANIUM AND COPPER OR IRON

The present invention relates to the production of unsaturated nitriles and in particular to the production of acrylonitrile.

Processes for the production of acrylonitrile by the vapour phase catalytic reaction of propylene, molecular oxygen and ammonia are known. The catalyst for use in such processes in general comprises compositions containing one or more polyvalent metals suitably compounded in the form of oxides. Thus, for example, British Patent Specification No. 931,940 (The Distillers Company Limited) describes a catalyst suitable for use in catalysing vapour phase catalytic reaction of propylene, molecular oxygen and ammonia, which catalyst comprises an oxide composition containing antimony, tin and titanium.

It is an object of the present invention to provide an improved process for the production of acrylonitrile using a catalyst containing antimony, tin and titanium.

Accordingly, the present invention is a process for the production of acrylonitrile which comprises reacting at an elevated temperature in the vapour phase propylene, molecular oxygen and ammonia over a catalyst which is an oxide composition comprising antimony, tin and titanium with, in addition, one or more of the oxides of the metals copper, magnesium, zinc, vanadium, uranium, chromium, manganese, molybdenum, tungsten, iron, cobalt, nickel, indium, arsenic, bismuth and tellurium.

The preferred catalyst is an oxide composition comprising antimony, tin and titanium, copper and/or iron, and/or uranium.

The oxide composition catalysts of the present invention may be regarded either as mixtures of the oxides of the various metal components or as oxygen-containing compounds of such metals; under the reaction conditions either or both forms may be present.

The catalyst may be prepared for instance by intimately mixing the oxides or compounds yielding the oxides on heating, or co-precipitation of the oxides, hydrated oxides or insoluble salts from an aqueous solution.

The proportions of the various components may vary within a moderately wide range. Thus, for example, suitable proportions are antimony to tin in atomic ratios 2/1 to 24/1, antimony to titanium in atomic ratio 1/1 to 24/1 with the amount of additional metal or metals varying from 0.5% to 30% molar of the total composition.

It is preferred to give the catalyst a prior heat-treatment for instance at a temperature between 550° and 1100°C in a molecular oxygen-containing gas.

The reaction of propylene with oxygen and ammonia over the catalysts may be carried out in any suitable manner, for instance as a fixed bed process in which the catalyst is used in the form of granules or pellets, or as a fluidised bed process, or as a moving bed process.

The proportion of propylene in the feed to the reaction may vary within fairly wide limits, for example, between 1 and 20% by volume of the feed, and suitably between 2 and 10% by volume.

It is preferred to use between 5 and 10% by volume of propylene in the feed.

The concentration of oxygen in the feed may also vary within moderately wide limits, for example, between 1 and 20% by volume. The oxygen may be diluted with inert gases, and may be, for example, supplied as air.

The reaction is suitably carried out in the presence, as diluent, of a gas which is substantially inert under the conditions of reaction, for example, nitrogen, propane, butane, isobutane, carbon dioxide, and steam. It is preferred to carry out the reaction in the presence of steam or mixtures of steam and nitrogen. The concentration of the steam may vary within wide limits, for instance between zero and 60% by volume of the feed.

The concentration of ammonia may also vary within moderately wide limits, for instance, between 2 and 10% by volume of the feed. If the maximum yield of acrylonitrile on propylene is required, it is desirable to use an excess of ammonia over propylene. For instance, the preferred concentration of ammonia is about 5 – 6% by volume of the feed where this contains 5% of propylene.

The reaction is carried out at an elevated temperature preferably below 550°C, e.g. between 350° and 500°C.

The contact time, defined as the volume of catalyst divided by the flow of gas per second calculated at room temperature and pressure, may be, for example, in the range 1 – 30 seconds.

The reaction may be carried out at atmospheric pressure, or at super- or sub-atmospheric pressures. It is preferred to operate at a pressure of 1 to 5 atmosphere absolute.

The acrylonitrile may be recovered from the reaction products in any suitable manner, for example, by extraction with water, preferably at an acid pH, followed by fractional distillation. In one method the hot reaction gases are contacted firstly with a hot aqueous solution of sulphuric acid and ammonium sulphate which neutralises excess ammonia, and secondly with cold water to extract the nitrile; the nitrile is subsequently recovered from the extract by fractional distillation.

The process of the present invention is described in more detail with reference to the following example.

EXAMPLE 1

Catalyst Sb/Ti/Cu/Fe/Sn = 3/1/0.25/0.25/0.25

Antimony trioxide (438 parts by weight) was added to a heated (100°C) stirred mixture of water (1500 parts) and 70% nitric acid. (531 parts), and this was followed by powdered tin (29.7 parts) added over 5 minutes. After cooling the mixture was filtered and the cake was suspended in water (1300 parts). To the stirred mixture was added $Cu(NO_3)_2.3H_2O$ (60.6 parts) in water (200 parts), and $Fe(NO_3)_3.9H_2O$ (101.4 parts) in water (200 parts), and it was heated to 50°C. Aqueous ammonia was added until the pH was 6.3, and after stirring for a further 15 min. the mixture was cooled to room temperature and filtered. Hydrated titanium oxide was previously prepared by dissolving tetraisopropyltitanate (284.8 parts) in a mixture of water (800 parts) and 70% nitric acid (170 parts), adding aqueous ammonia to pH 6.5, and filtering after stirring at 50°C for 30 min. The cake was washed by re-suspending in water (3200 parts) and filtering. This cake was re-suspended in water (2600 parts) and to this was added the other filter cake with stirring for 1 hour. After filtration, the product was dried at 120°C until 15% water remained, sieved and granulated. After drying at 120°C the product was passed through a cake breaker and pelleted in cylinders of 4 mm. diameter and 4 mm. length. The pellets were heat treated in a furnace in which the temperature was raised at 22°C per hour, and in which an air stream was injected at a rate of 50 l/hr./Kg. catalyst. When the temperature reached 780°C it was maintained for 16 hours and then cooled.

Testing of the catalyst, in a reactor at 470°C with a feed of 5% propylene, 6% ammonia, 60% air and 29% steam (by volume) and at a contact time of 8 seconds showed the following product yields

| | |
|---|---|
| acrylonitrile | 70.1% (molar) |
| acrolein | 0.9% |
| hydrogen cyanide | 4.5% |
| $CO_2$ | 12.0% |
| CO | 3.6% |
| unreacted propylene | 5.0% |

EXAMPLES 2–9

The catalysts identified in the following Table I were prepared in the same way as the catalyst in Example 1, but with differing proportions of the starting components. They were heat treated in the same way as in Example 1, slight variations in the final temperature being indicated in Table I.

EXAMPLES 10–12

The catalysts identified in Table II were prepared by the same general method as the catalyst in Example 1, the required compositions being obtained by modifying the component quantities and adding, omitting and/or replacing the component compounds or salts as required.

EXAMPLES 13 and 15

The catalysts in Examples 13 and 15 in Table II were prepared by a modification of the method used for the catalyst in Example 1. The modification involved the co-precipitation of the hydrated titanium oxide together with the other metallic hydrated oxides instead of separate precipitation. Thus the appropriate weight of tetraisopropyltitanate was dissolved in aqueous/nitric acid of 17% concentration to give a 30% solution (by weight) and this solution was added to the stirred mixture just before the addition of the copper and ferric nitrate solutions. After this the preparation proceeded as in Example 1, but with the corresponding omission of the later addition of separately prepared hydrated titanium oxide. For the catalyst in Example 15 the appropriate quantity of uranyl nitrate in aqueous solution was additionally added after the ferric nitrate solution.

EXAMPLES 14, 16, 17 and 18

The catalysts in Examples 14, 16, 17 and 18 (in Tables II and III) were prepared by the same general method as the catalyst in Example 1 except that titanium tetrachloride was used instead of tetra-isopropyltitanate as the source of the separately prepared hydrated titanium oxide. The titanium tetrachloride was dissolved in a 2% aqueous HCL solution to give a 10% solution by weight, and the hydrated titanium hydroxide was precipitated with aqueous ammonia. The filtered precipitate was washed free of contaminants by re-suspending twice in water and filtering, before incorporation in the rest of the mixture. The required catalyst composition was obtained by modifying the component quantities, and adding, omitting and/or replacing the component compounds or salts as required.

CATALYST EVALUATION

The catalysts prepared as described in Examples 2–18 above were tested by the same method as described in Example 1 with the exception of catalyst 15. The test method for this catalyst differed only in the mixture of the feed gases, which were in the following proportions (by volume) 6% propylene, 6.5% ammonia, 68.5% air and 19% steam.

Tables I, II and III illustrate the results of the evaluation of the various catalysts with respect to the variations in the yields of reaction products.

Table I

| Example No. | Catalyst atomic proportions | | | | | Temperature °C | | Yields (Molar on propylene fed) | | | | | | Acrylonitrile Efficiency % |
|---|---|---|---|---|---|---|---|---|---|---|---|---|---|---|
| | Sb | Ti | Cu | Fe | Sn | HT | RT | Acrylo-nitrile | Acrolein | Hydrogen cyanide | $CO_2$ | CO | Propylene | |
| 2 | 3 | 1 | 0.25 | 0.5 | 0.25 | 780 | 447 | 69.4 | 1.9 | 5.0 | 7.0 | 2.6 | 9.9 | 77 |
| 3 | 3 | 1 | 0.25 | 1 | 0.25 | 830 | 472 | 70.2 | 1.2 | 5.9 | 9.0 | 3.7 | 6.1 | 75 |
| 4 | 3 | 1 | 0.25 | 0.5 | 0.5 | 830 | 467 | 74.0 | 0.9 | 6.1 | 8.9 | 4.3 | 2.4 | 76 |
| 5 | 3 | 1 | 0.27 | 0.75 | 0.5 | 830 | 470 | 68.8 | 1.5 | 5.8 | 7.1 | 3.8 | 8.9 | 75.5 |
| 6 | 3 | 0.5 | 0.25 | 0.25 | 0.25 | 760 | 464 | 67.5 | 1.4 | 5.1 | 9.0 | 3.0 | 8.7 | 74 |
| 7 | 3 | 0.5 | 0.25 | 0.5 | 0.25 | 780 | 472 | 71.6 | 0.8 | 6.4 | 9.6 | 4.1 | 2.6 | 73.5 |
| 8 | 3 | 0.5 | 0.25 | 0.25 | 0.5 | 750 | 469 | 67.6 | 1.1 | 5.7 | 11.1 | 3.5 | 6.3 | 72 |
| 9 | 3 | 0.5 | 0.25 | 0.5 | 0.5 | 780 | 444 | 70.6 | 1.3 | 5.4 | 10.5 | 3.6 | 4.8 | 74 |

Table II

| Ex. No. | Catalyst Atomic Proportions | Temperature °C HT | Temperature °C RT | Acrylonitrile | Acrolein | Hydrogen Cyanide | CO$_2$ | CO | Propylene | Acrylonitrile Efficiency % |
|---|---|---|---|---|---|---|---|---|---|---|
| 10 | Sb/Ti/Co/Fe/Sn 3/0.25/0.25/0.25/1 | 810 | 436 | 69.2 | 1.0 | 6.4 | 10.5 | 4.3 | 5.5 | 73 |
| 11 | Sb/Ti/Ni/Fe/Sn 3/0.25/0.25/0.25/1 | 810 | 469 | 67.6 | 0.8 | 5.8 | 11.1 | 4.2 | 5.4 | 71.5 |
| 12 | Sb/Ti/Mn/Fe/Sn 3/0.25/0.25/0.25/1 | 810 | 480 | 68.7 | 0.7 | 6.5 | 11.6 | 4.5 | 3.7 | 71.5 |
| 13 | Sb/Ti/Cu/Fe/Sn 3/0.25/0.25/0.25/1 | 830 | 450 | 71.4 | 1.1 | 5.0 | 11.3 | 3.3 | 6.5 | 76.4 |
| 14 | Sb/Ti/Cu/Fe/Sn/Te 3/0.25/0.25/0.25/1/0.06 | 780 | 454 | 72.0 | 1.4 | 5.1 | 9.4 | 3.4 | 5.6 | 76.5 |
| 15 | Sb/Ti/Cu/Fe/Sn/U 3/0.25/0.25/0.25/1/0.25 | 320 | 450 | 76.6 | 1.1 | 4.3 | 8.4 | 2.8 | 3.7 | 79.5 |

HT = Heat treatment temperature
RT = Reaction temperature

TABLE 3

Feed composition: Propylene/ammonia/air/steam rates=6/6/65/23 by volume. Reactor pressure—atmospheric. Contact time 8 sec. (NTP)

| No. | Catalyst Composition | | | | | Temperature °C | | Yields % on propylene fed at optimum bath temperature | | | | | |
|---|---|---|---|---|---|---|---|---|---|---|---|---|---|
| | Sb | Sn | Cu | Fe | Ti | HT | RT | AN | ACO | HCN | CO$_2$ | CO | Rec'd C$_3$H$_6$ |
| 16 | 3 | 1 | 0.5 | 0.25 | 0.25 | 850 | 450 | 70.1 | 2.1 | 4.9 | 8.5 | 3.3 | 7.3 |
| 17 | 3 | 1 | 0.25 | — | 0.25 | 825 | 462 | 68.8 | 2.4 | 5.1 | 8.8 | 3.0 | 8.7 |
| 18 | 3 | 1 | — | 0.25 | 0.25 | 825 | 450 | 69.4 | 1.8 | 5.8 | 12.3 | 5.0 | 3.2 |

HT=Heat treatment temperature
RT=Reaction temperature

We claim:

1. A process for preparing acrylonitrile which comprises reacting, in the vapor phase and at an elevated temperature, propylene, molecular oxygen, and ammonia in the presence of an oxide composition catalyst, which is a mixture of oxides of the metal components or of oxygen-containing compounds of the metal components or a mixture of both forms, and in which the metal components consist essentially of antimony, tin, titanium, and copper or iron; the atomic ratio of antimony to tin in said catalyst being from 2:1 to 24:1, the atomic ratio of antimony to titanium being from 1:1 to 24:1, and the amount of copper or iron present being from 0.5% to 30% molar of the total composition.

2. A process as claimed in claim 1 wherein the catalyst is heat treated, before use, at a temperature between 550° and 1100°C in a molecular oxygen-containing gas.

3. A process as claimed in claim 1 wherein the proportion of propylene in the reactant feed is between 1 and 20% by volume.

4. A process as claimed in claim 1 wherein the proportion of oxygen in the reactant feed is between 1 and 20% by volume.

5. A process as claimed in claim 1 wherein the reaction temperature is between 350° and 500°C.

6. A process as claimed in claim 1, wherein said metal elements consist essentially of antimony, tin, titanium and copper.

7. A process as claimed in claim 1, wherein said metal elements consist essentially of antimony, tin, titanium and iron.

8. A process as defined in claim 1, wherein the proportion of ammonia in the reaction feed is between 2 and 10% by volume.

9. A process for preparing acrylonitrile which comprises reacting, in the vapor phase and at elevated temperature, propylene, molecular oxygen, and ammonia in the presence of an oxide composition catalyst, which is a mixture of oxides of the metal components or of oxygen-containing compounds of the metal components or a mixture of both forms, and in which the metal components consist essentially of antimony, tin, titanium, copper or iron, and an additional metal selected from the group consisting of vanadium, uranium, manganese, cobalt, nickel and tellurium; the atomic ratio of antimony to tin in said catalyst being from 2:1 to 24:1, the atomic ratio of antimony to titanium present in said catalyst being from 1:1 to 24:1, and the amount of additional metals present being from 0.5% to 30% molar of the total composition.

10. A process as defined in claim 9 wherein said metal elements consist essentially of antimony, tin, titanium, iron and cobalt.

11. A process as defined in claim 9 wherein said metal elements consist essentially of antimony, tin, titanium, iron and nickel.

12. A process as defined in claim 9, wherein said metal elements consist essentially of antimony, tin, titanium, iron and manganese.

13. A process for preparing acrylonitrile which comprises reacting, in the vapor phase and at elevated temperature, propylene, molecular oxygen, and ammonia in the presence of an oxide composition catalyst, which is a mixture of oxides of the metal components or of oxygen-containing compounds of the metal components or a mixture of both forms, and in which the metal components consist essentially of antimony, tin, titanium, copper and iron; the atomic ratio of antimony to tin in said catalyst being from 2:1 to 24:1, the atomic ratio of antimony to titanium present in said catalyst being from 1:1 to 24:1, and the amount of copper and iron present being from 0.5% to 30% molar of the total composition.

14. A process for preparing acrylonitrile which comprises reacting, in the vapor phase and at elevated temperature, propylene, molecular oxygen, and ammonia in the presence of an oxide composition catalyst, which is a mixture of oxides of the metal components or of oxygen-containing compounds of the metal components or a mixture of both forms, and in which the metal components consist essentially of antimony, tin, titanium, copper, iron, and an additional metal selected from the group consisting of vanadium, uranium, manganese, cobalt, nickel and tellurium; the atomic ratio of antimony to tin in said catalyst being from 2:1 to 24:1, the atomic ratio of antimony to titanium present in said catalyst being from 1:1 to 24:1, and the amount of additional metals present being from 0.5% to 30% molar of the total composition.

15. A process as defined in claim 14 wherein said metal elements consist essentially of antimony, tin, titanium, iron, copper, and tellurium.

16. A process as claimed in claim 14, wherein said metal elements consist essentially of antimony, tin, titanium, copper, iron and uranium.

* * * * *